Jan. 25, 1955　　　H. E. HODGSON　　　2,700,439
ELECTROMAGNETIC BRAKE
Filed Jan. 11, 1952　　　　　　　　　　2 Sheets-Sheet 1
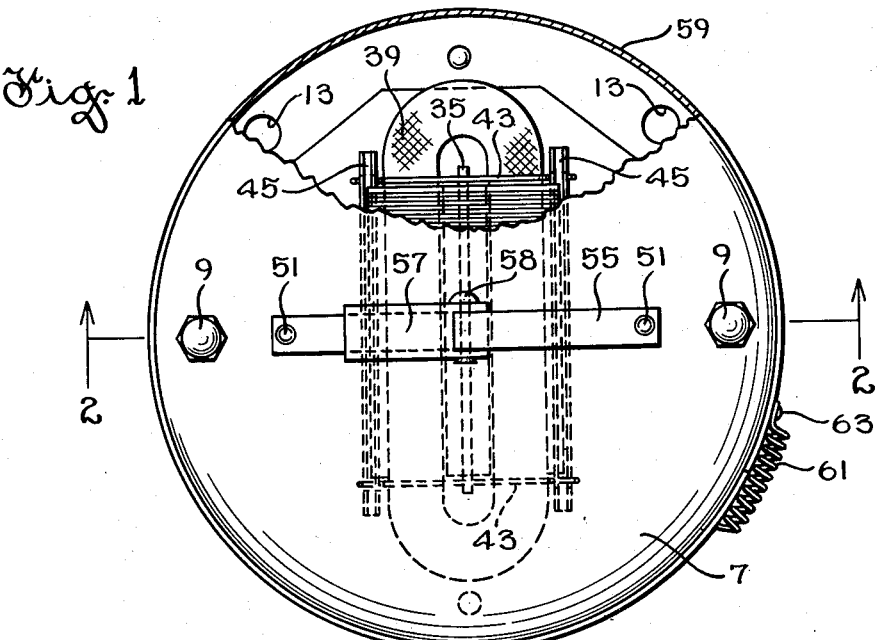
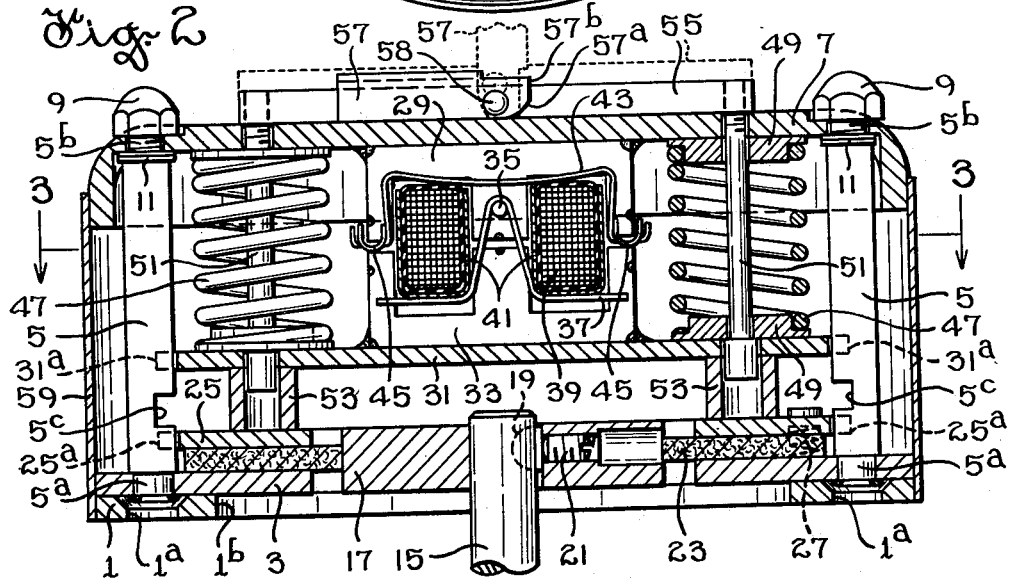
Inventor
Howard E. Hodgson
By W. E. Lyon
Attorney

United States Patent Office 2,700,439
Patented Jan. 25, 1955

2,700,439
ELECTROMAGNETIC BRAKE

Howard E. Hodgson, Wauwatosa, Wis., assignor to Cutler-Hammer, Inc., Milwaukee, Wis., a corporation of Delaware Application January 11, 1952, Serial No. 265,999

4 Claims. (Cl. 188—171)

This invention relates to electromagnetic brakes, and more particularly to disk type brakes for use with electric motors.

A primary object of the invention is to improve and simplify the construction of brakes of the aforementioned type.

Another object is to provide for ready removal and replacement of the friction plates of such a brake, while requiring only a minimum amount of disassembly of the brake parts.

Another object of this invention is to provide an electromagnetic brake of the aforesaid type wherein the magnet coil may be readily replaced by a new coil without requiring disassembly of any substantial number of parts and without disconnecting the brake from the motor.

Another object of the invention is to provide an electromagnetic disk type brake wherein the coil is protected against damage due to the movement of the laminations.

A more specific object is to provide an electromagnetic brake having a manual releasing mechanism which, when the coil is deenergized, may be utilized to render the friction plates ineffective.

A further object is to provide an electromagnetic brake of the aforementioned type having a manual releasing mechanism which is automatically rendered ineffective upon energization of the magnet coil.

The novel features which I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:

Figure 1 is an elevational view having part of the end plate broken away;

Fig. 2 is a sectional view taken substantially along line 2—2 of Fig. 1, and

Figure 3:
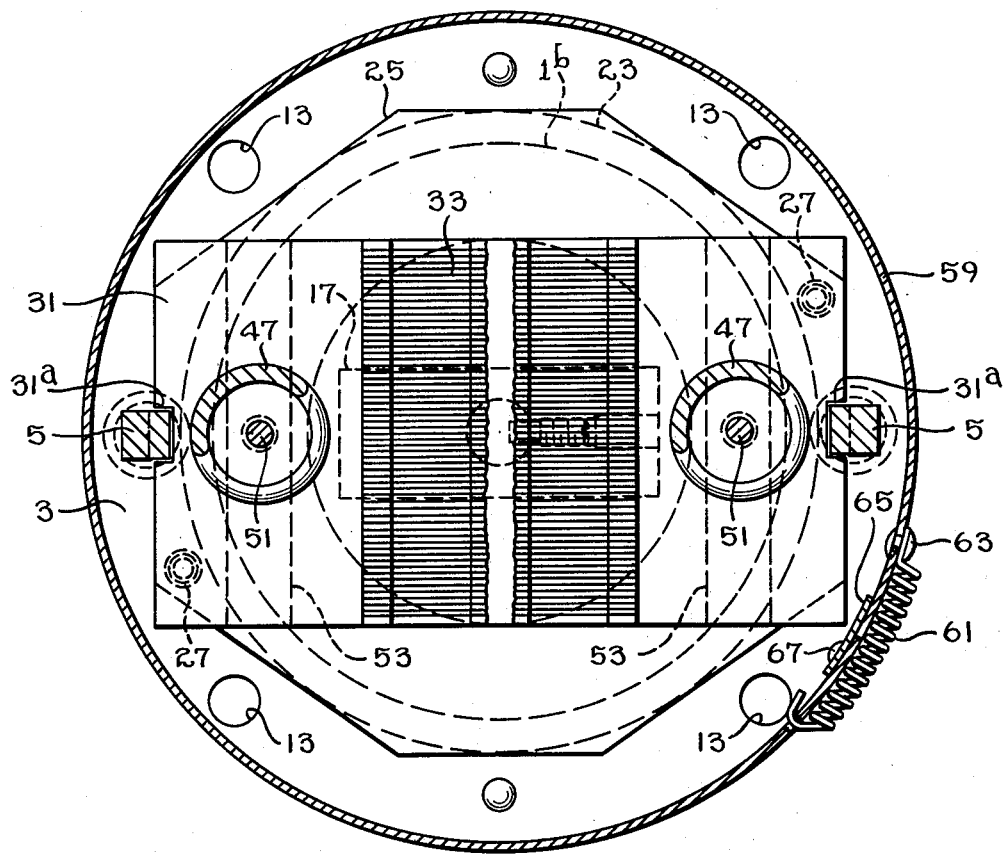
Fig. 3 is a sectional view taken substantially along line 3—3 of Fig. 2.

The fixed part of the brake apparatus shown in the drawings comprises a circular mounting plate 1, a stationary friction plate 3, bolts 5 and an end plate 7. The bolts 5 are formed with small end portions 5ª which are rigidly fastened to the stationary friction plate 3 as by riveting or upsetting the end portions 5ª, as shown in Fig. 2. Such end portions 5ª might also be secured by a suitable welding operation. The other end portions of said bolts 5 are formed with threads 5ᵇ. Said threaded end portions 5ᵇ are rigidly secured to the end plate 7 by means of cap nuts 9. The intermediate portions of bolts 5 are each formed with cutouts 5ᶜ of such dimensions as to permit the end portions of plates 25 and 31 (to be hereinafter described) to slidably pass therethrough. As is apparent from an understanding of the purpose of said cutouts 5ᶜ, the bolts 5 must be positioned on plate 3 as shown in Fig. 2. Washers 11 of varying thicknesses are inserted between the main portions of bolts 5 and the end plate 7 to act as shims so as to permit variations in the space between end plate 7 and the stationary friction plate 3.

Mounting plate 1 is constructed with drilled and countersunk openings 1ª in order to permit said plate 1 to lie evenly against friction plate 3. Mounting plate 1 and friction plate 3 are rigidly fastened together and jointly secured to the end housing of a conventional electric motor (not shown) by means of bolts (also not shown) inserted through apertures 13.

Mounting plate 1 is further provided with a large opening 1ᵇ to permit insertion therethrough of the motor shaft 15 and brake hub 17. The hub 17 is substantially rectangular in shape (Fig. 3) and is fastened to shaft 15 in a conventional manner by means of a key 19 and set screw 21 to permit said hub to slide axially thereon. A fibrous rotatable friction plate 23 having a substantially circular periphery is provided with a centrally disposed substantially rectangular opening for the purpose of snugly receiving the brake hub 17.

A slidable friction plate 25 is positioned on one side of the rotatable friction plate 23 and has a substantially octagonal outer periphery and a substantially circular centrally disposed opening. A pair of opposite sides of said octagonal plate 25 are each provided with cutouts 25ª located substantially intermediate the ends of said side portions. It is necessary that such cutouts 25ª be of such size so as to permit sliding engagement between said bolts 5 and said cutouts 25ª. It is also essential that the above-mentioned pair of opposite sides be of such size and shape as to permit sliding engagement between the post cutouts 5ᶜ and the respective sides of plate 25 for a purpose to be hereinafter explained. Diametrically opposed with respect to the motor shaft 15 and positioned between the non-rotatable friction plates 3 and 25 are compression springs 27 which bias said non-rotatable friction plates from contact with friction plate 23.

Rigidly secured, preferably by arc welding, to the inner side of end plate 7 is a set of conventional E-shaped laminations 29. Rigidly secured by the heliarc process to an armature plate 31 is a second set of E-shaped laminations 33. The lamination sets are formed of individual laminations which have been securely fastened to each other as by means of heliarc welding. Said second set of laminations 33 are inverted with respect to the first mentioned set 29 to provide a magnet core and openings wherein the magnet coil is positioned. Said plate 31 is substantially rectangular as seen in Fig. 3 and is constructed with a pair of cutouts 31ª to permit sliding engagement between said cutouts 31ª and bolts 5. For a purpose to be hereinafter explained, it is necessary that the end portions which are constructed with cutouts 31ª be of such dimensions as to permit sliding engagement between the cutouts 5ᶜ of bolts 5 and said end portions.

The magnet coil is conventional as regards coils used in alternating current electromagnetic brakes and clutches and is here shown as formed into substantially elliptical shape (Fig. 1). Through the center arm of the E-shaped lamination set 29 extends a pin 35 which supports coil retainers 37 at either end of the magnet core. Supported by the horizontal portions of the coil retainer 37 is the above-mentioned magnet coil 39. Those portions of the magnet coil which extend through the openings provided by the sets of laminations are covered on three sides by stainless steel coil guards 41, as shown in Fig. 2. The coil 39 is provided with the coil guards 41 to eliminate any damage to the coil due to the repeated movement of lamination set 33; said movement to be hereinafter explained.

Resting on top of the magnet coils on either side of the magnet core are shading coil retainers 43 having upturned end portions which are adapted to engage and support conventional shading coils 45. Interposed between the end plate 7 and the armature plate 31 are compression springs 47 both having at each end thereof spring glands 49. Said glands 49 are provided with centrally disposed apertures for slidably receiving the main body portion of posts 51. Said posts 51 have enlarged end portions which slidably engage apertures in the substantially rectangular armature plate 31. Said enlarged end portions form annular shoulders with the main body portion of the posts 51; said shoulders being capable of engaging the respective spring glands which rest against the armature plate 31. Interposed between the slidable friction plate 25 and the armature plate 31 are spacing bars 53. Said bars 53 are formed with transverse openings for slidably receiving the enlarged end portions of posts 51 and are provided in order to transmit the force of compression springs 47 to the slidable friction plate 25.

The posts 51 have threaded end portions which extend through openings in the end plate 7. On the outside of end plate 7 and threadedly engaged by the posts 51, at opposite ends thereof, is a bar 55. Rotatably attached at the central point of bar 55 as by means of a pin 58 is an operating lever 57. Said operating lever 57 is formed with an arcuate edge portion 57ª and a flat portion 57ᵇ so as to enable said lever to be moved from the solid line position to the dotted line position as shown in Fig. 2. The flat portion 57ᵇ of lever 57 enables the lever to remain in the dotted line position if desired.

The wrap-around cover 59 is employed to complete the enclosing of all of the brake parts and rests against the peripheries of plates 1, 3 and 7. Said wrap-around cover is provided with a spring latch, shown in Fig. 1. Said latch consists of a spring 61 having one of its ends fastened as by means of a rivet 63 to one of the ends of said cover 59 and an aligning plate 65 fastened as by means of rivets 67 to the other free end of said cover 59. The loose end of said spring 61 is formed so as to engage an opening in the cover 59 to provide a substantial abutting relation between the ends thereof.

When used in conjunction with a conventional electric motor the brake shown in the drawings is electrically connected so that the coil 39 is energized simultaneously with the motor. When this condition exists an electromagnet is formed, thus drawing the lamination set 33 toward the set 29. This action compresses the springs 47 and consequently reduces the pressure on spacers 53 and plate 25, enabling compression springs 27 to move said plate 25 away from the rotatable friction plate 23. This of course releases the braking effect and enables the motor shaft 15 to rotate. When it is desired to stop the motor by use of the brake shown, the coil 39 is simultaneously deenergized with the disconnection of the power leads to the electric motor. This action enables the compression springs 47 to exert a force through the spacers 53 onto the friction plate 25. The effect of the compression springs 27 is thus overcome and the friction plates are rapidly thrown into engagement. The motor is thus quickly brought to rest.

Should it be desired to rotate the motor shaft while the electric energy supply has been terminated, it becomes essential to release the braking effect created by the engagement of the friction plates. This can be accomplished by rotating the operating lever 57 from the solid line position to the dotted line position, as shown in Fig. 2. The bar 55 and posts 51 are thus moved to effect movement of the spring glands 49 away from the armature plate 31. The compression springs 27 then become effective to move the friction plate 25 away from plate 23, thus allowing the motor shaft to be rotated.

In order to render the manual releasing mechanism ineffective in the event that the motor and brake are reenergized, the brake shown in the drawings must be mounted on the end housing of the motor so that the operating lever 57 as shown in the solid line position, is pointing downwardly. It thus becomes apparent that whenever the magnet coil 39 is energized so as to move the lamination set 33 toward set 29 said operating lever 57 must necessarily fall into the solid line position due to the gravitational effect thereon. In this manner the brake will be effective whenever the magnet coil 39 is deenergized.

Should it become necessary to repair or replace some of the friction plates or the magnet coil the following steps may be taken. The cover 59 is first removed by unlatching the spring 61 from across the abutting ends of said cover and axially sliding the cover over end plate 7 so as to expose the inner parts of the brake. The spacing bars 53 are then removed by manually moving the bar 55 so as to permit sliding said spacing bars from between plates 25 and 31. This movement of bar 55 releases the effect of springs 47 on plate 31 and must be sufficient to remove the enlarged end portions of posts 51 from within the transverse openings of the spacing bars. After the spacers 53 have been removed, the slidable friction plate 25 is easily removed by aligning said friction plate 25 with the cutouts in the posts 5 and sliding said plate through said cutouts in a direction transverse to the axis of the motor shaft 15. The rotatable friction plate 23 can be removed by sliding said plate 23 off of the rectangular hub 17 and over the end of motor shaft 15.

The magnet coil 39 can be easily removed while the lever 57 is in the dotted line position by first removing the armature plate 31 in a manner similar to the method utilized for removing friction plate 25. This involves aligning the ends of plate 31 with the cutouts in posts 5 after the spacers 53 have been removed, and then sliding said plate 31 through the cutouts in a direction transverse to the axis of motor shaft 15. As is readily apparent, the lamination set 33 is also removed with the armature plate 31. The coil retainers 37 are then slidably removed from the pin 35 permitting the coil 39 to be removed from the lamination set 29 and lifted out of the brake proper. At this point it is possible to remove the shading coils 45 by lifting said coils and their retainer 43 from their positions adjacent the lamination set 29.

The brake parts removed according to the above procedures can be reassembled within the brake by employing the appropriate procedure in its reverse fashion. Thus the brake parts which are most susceptible to failure can be readily replaced without an extensive disassembly of the brake.

I claim:

1. An electromagnetic brake comprising, a rotatable braking element, a non-rotatable braking element, biasing means to effect engagement of said elements, electromagnetic means operable to effect disengagment of said elements and comprising a stationary core member, a movable core member and an operating coil, said movable core member being movable relative to said coil and enveloping a part of said coil when the same is in an energized state, and a coil shield on said operating coil to protect the same from damage due to movement of said movable core member.

2. The combination with an electromagnetic brake comprising a pair of engageable and disengageable braking elements, an electromagnetic means for controlling the engagement of said elements and comprising a movable core member attached to one of said braking elements and an energizable operating coil to provide movement to said core member, said movable core member being movable relative to said coil and enveloping a part of said coil when the same is in an energized state, of a metallic coil shield on said operating coil to protect the same from damage resulting from movement of said core member.

3. An electromagnetic brake comprising, a rotatable braking element, a non-rotatable braking element capable of engaging said first mentioned braking element but biased into disengagement therefrom, biasing means capable of overcoming said first mentioned bias for affording engagement of said elements, electromagnetic means having a stationary core member, an operating coil and a movable core member secured to said non-rotatable braking element, said operating coil secured to said stationary core member and having a coil shield to protect the same from wear due to movement of said movable core member and energizable to attract said movable core member to thus overcome said biasing means to effect disengagement of said braking elements, and holding means including a manually operable latchable lever to effect continued disengagement of said braking elements following latching of said lever, said lever being rendered unlatched following energization of said operating coil due to the gravitational force on said lever.

4. An electromagnetic brake comprising, a rotatable braking element, a pair of non-rotatable braking elements arranged on opposite sides of said former element, one of said non-rotatable braking elements being fixed and the other being movable toward and away from said fixed braking element, at least one post slidably engaging said non-rotatable movable braking element and having one end attached to said fixed element and the other end attached to an end plate, an armature plate slidably engaging said post and having thrust parts associated therewith for engaging said non-rotatable movable element to move the same toward said fixed element, means on said post to permit removal of said armature plate and said non-rotatable movable element without disassembling said post or said end plate, spring means positioned between said armature plate and said end plate to bias said armature plate in a direction to effect engagement of said braking elements, and an operating coil for moving said armature plate against the effect of said spring means to effect disengagement of said braking elements.

References Cited in the file of this patent

UNITED STATES PATENTS

| Number | Name | Date |
|---|---|---|
| Re. 23,362 | Hallander | May 1, 1951 |
| 596,097 | Wellman | Dec. 28, 1897 |
| 2,077,888 | Larsh | Apr. 20, 1937 |
| 2,461,759 | Nelson et al. | Feb. 15, 1949 |
| 2,543,830 | Burrus et al. | Mar. 6, 1951 |